(12) United States Patent
Johnson

(10) Patent No.: US 10,218,923 B2
(45) Date of Patent: Feb. 26, 2019

(54) METHODS AND APPARATUS FOR PIXEL BINNING AND READOUT

(71) Applicant: SEMICONDUCTOR COMPONENTS INDUSTRIES, LLC, Phoenix, AZ (US)

(72) Inventor: Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 17 days.

(21) Appl. No.: 15/435,351

(22) Filed: Feb. 17, 2017

(65) Prior Publication Data

US 2018/0241953 A1    Aug. 23, 2018

(51) Int. Cl.
| | | |
|---|---|---|
| *H04N 5/347* | (2011.01) | |
| *H04N 5/378* | (2011.01) | |
| *H04N 5/369* | (2011.01) | |
| *H04N 7/01* | (2006.01) | |
| *H04N 5/232* | (2006.01) | |
| *G06K 9/00* | (2006.01) | |

(52) U.S. Cl.
CPC ........... *H04N 5/347* (2013.01); *H04N 5/3698* (2013.01); *H04N 5/378* (2013.01); *G06K 9/00281* (2013.01); *H04N 5/23219* (2013.01); *H04N 7/0127* (2013.01)

(58) Field of Classification Search
None
See application file for complete search history.

(56) References Cited

U.S. PATENT DOCUMENTS

| | | | | |
|---|---|---|---|---|
| 6,455,831 B1* | 9/2002 | Bandera | ................. | G06K 9/605 250/208.1 |
| 6,839,452 B1* | 1/2005 | Yang | ....................... | H03F 3/082 348/E3.02 |
| 7,408,572 B2* | 8/2008 | Baxter | ................... | H04N 5/335 348/169 |
| 7,551,203 B2* | 6/2009 | Nakayama | ........... | H04N 1/0411 348/208.14 |
| 8,089,522 B2* | 1/2012 | Choi | ...................... | H04N 3/155 348/206 |
| 9,030,583 B2* | 5/2015 | Gove | ................... | H04N 5/3696 348/207.1 |
| 2004/0246354 A1 | 12/2004 | Yang | | |
| 2006/0108506 A1 | 5/2006 | Yang | | |
| 2013/0087683 A1 | 4/2013 | Mo | | |
| 2016/0080645 A1* | 3/2016 | Ohba | ................. | H04N 5/23229 348/207.11 |

* cited by examiner

*Primary Examiner* — James M Hannett
(74) *Attorney, Agent, or Firm* — The Noblitt Group, PLLC; Hettie L. Haines

(57) ABSTRACT

Various embodiments of the present technology may comprise a method and apparatus for pixel binning and readout. The method and apparatus may determine a region of interest and a region of non-interest within an image frame according to a detected feature. In various embodiments, the method and apparatus may readout each row in the region of interest resulting in a high resolution region and combine the pixels within the region of non-interest resulting in a low resolution region.

19 Claims, 8 Drawing Sheets

METHODS AND APPARATUS FOR PIXEL BINNING AND READOUT

BACKGROUND OF THE TECHNOLOGY

Electronic devices, such as cellular telephones, cameras, automobiles, and computers, commonly use image sensors to capture images. A typical CMOS (complementary metal-oxide-semiconductor) imager circuit includes a focal plane array of pixels, and each pixel includes a photo-sensor, such as a photogate or photodiode for accumulating photo-generated charge in a portion of the substrate.

Digital images are constructed using data from the pixels, and may be described according to their spatial resolution. Images having higher spatial resolution are composed with a greater number of pixels than those of lower spatial resolution. In general, there are trade-offs between the frame rate (the number of times the full pixel array can be read in a second), spatial resolution, and power consumption. To obtain high resolution images, conventional systems readout the entire pixel array, which results in lower frame rates and requires higher power consumption. To maintain the same frame rate, the systems that produce higher resolution images must consume more power relative to the systems that produce lower resolution images, as power consumption is related to the pixel clocking frequency.

SUMMARY OF THE INVENTION

Various embodiments of the present technology may comprise a method and apparatus for pixel binning and readout. The method and apparatus may determine a region of interest and a region of non-interest within an image frame according to a detected feature. In various embodiments, the method and apparatus may readout each row in the region of interest resulting in a high resolution region and combine the pixels within the region of non-interest resulting in a low resolution region.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 3:
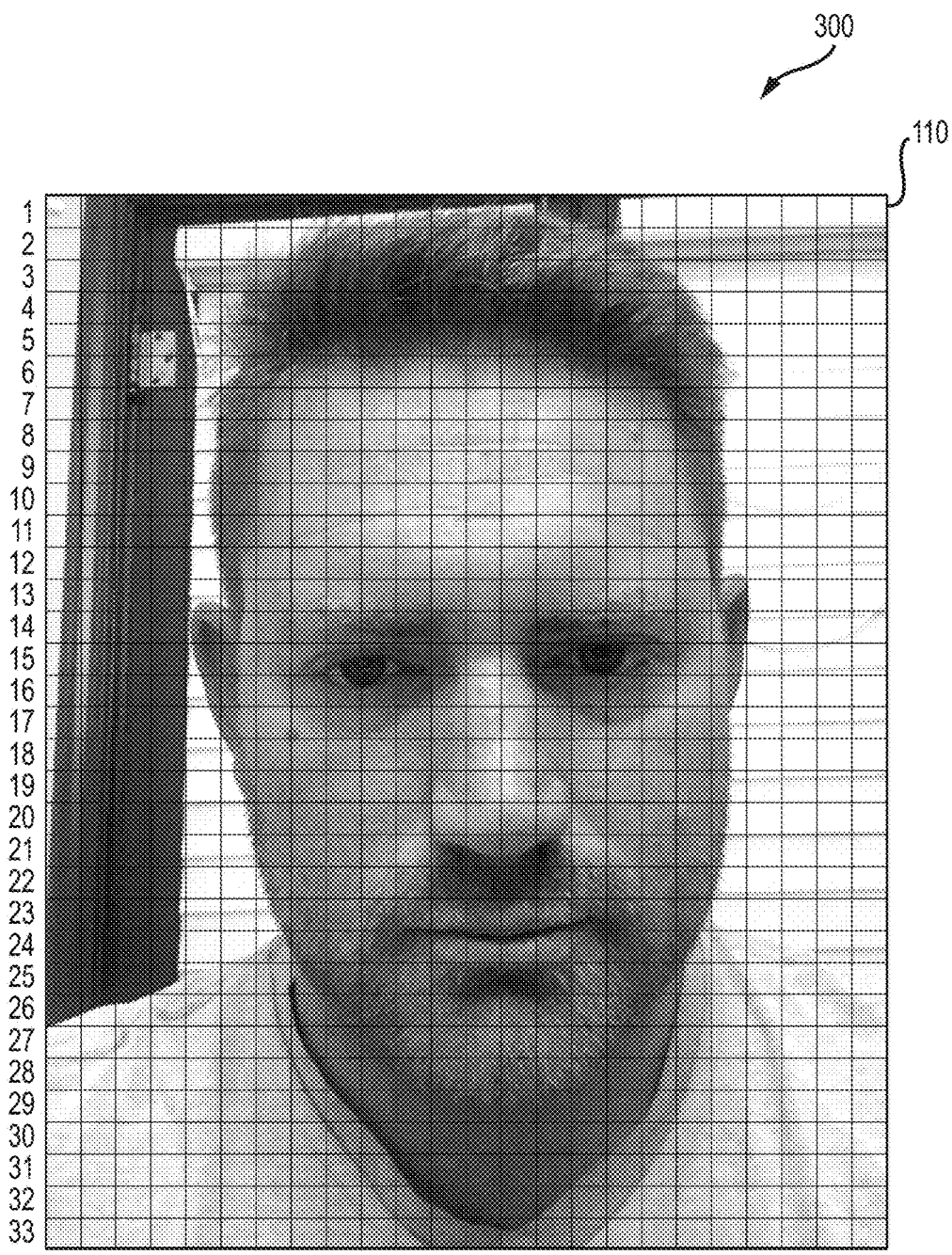
Figure 4:
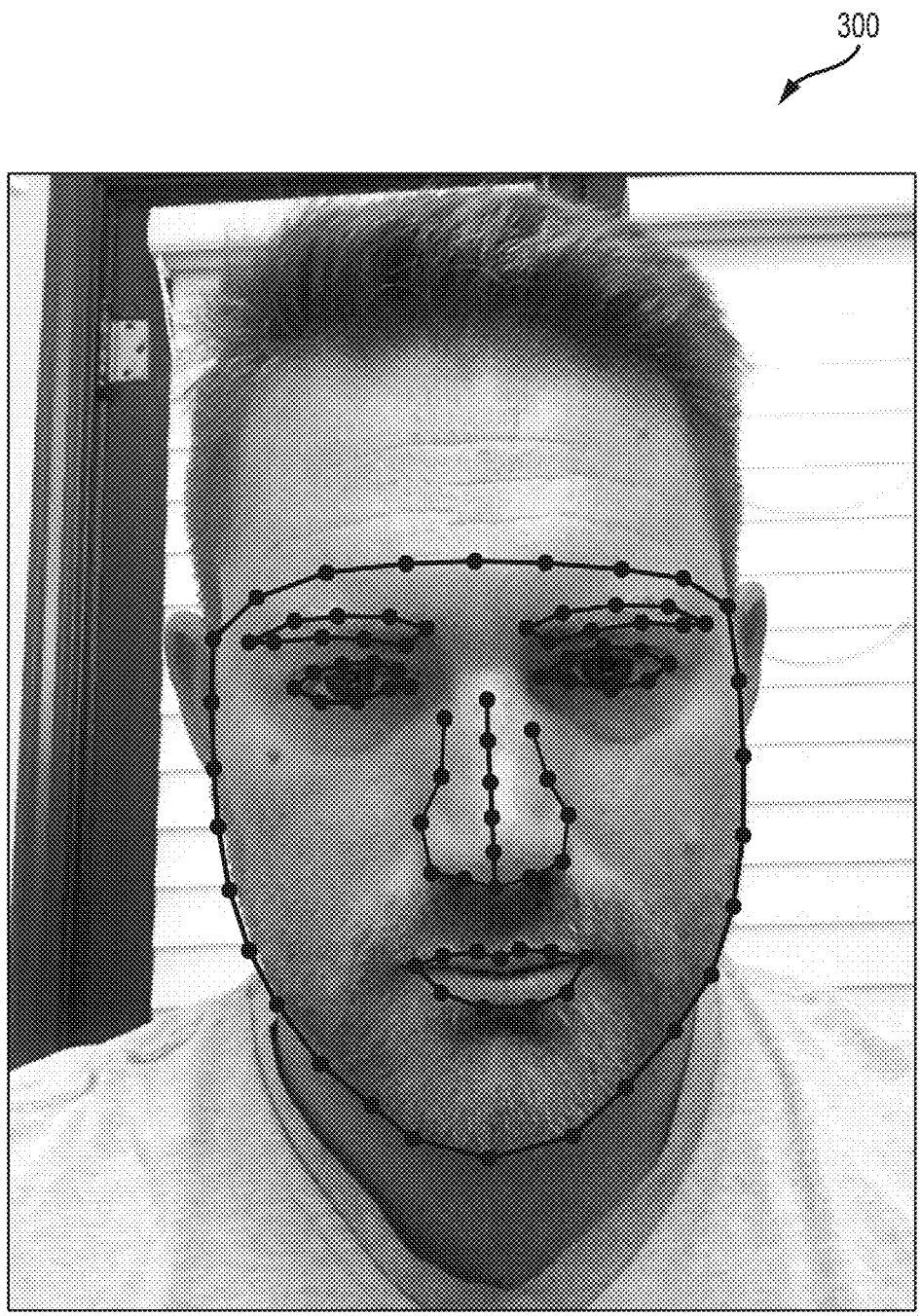
Figure 5:
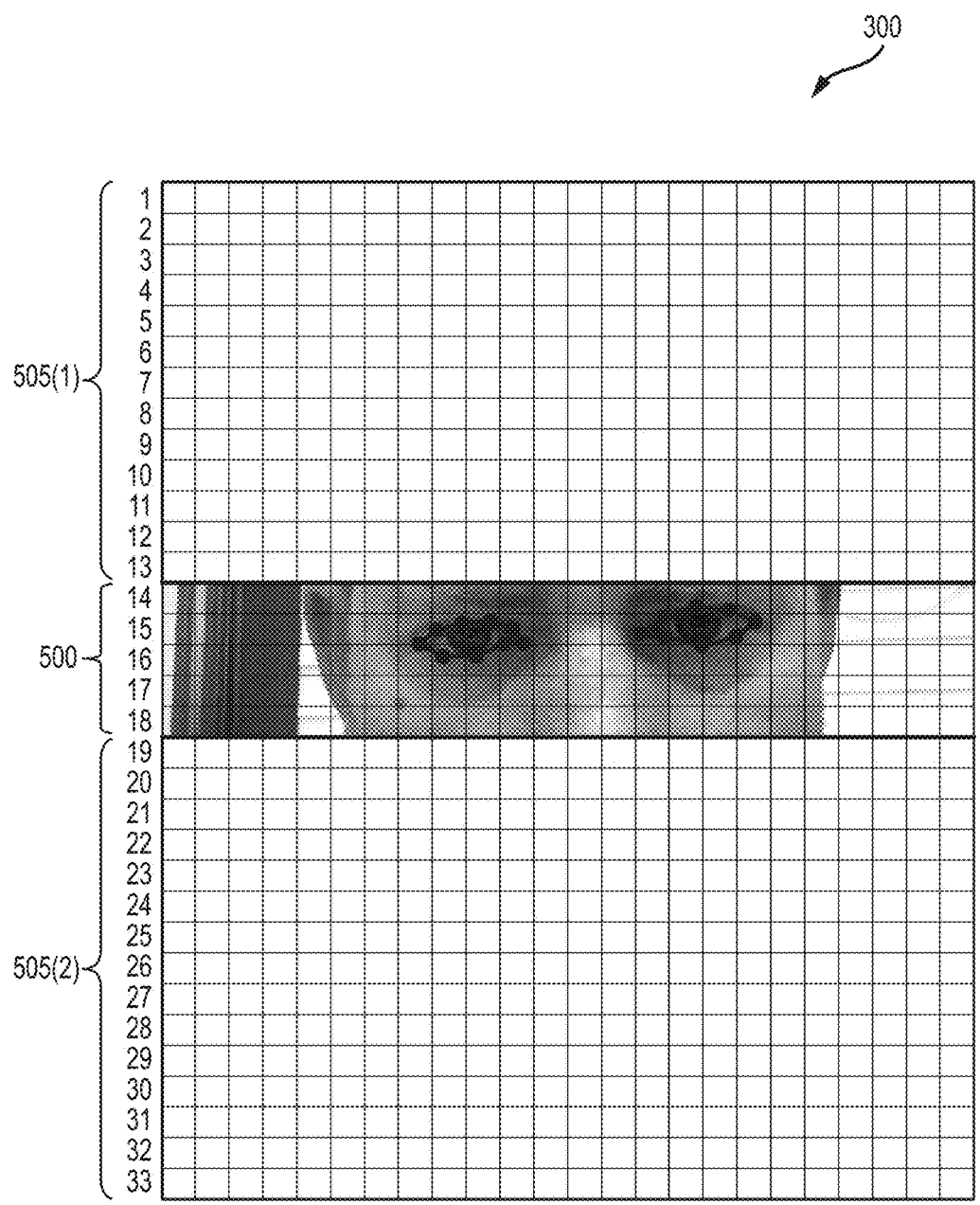
Figures 6A, 6B:
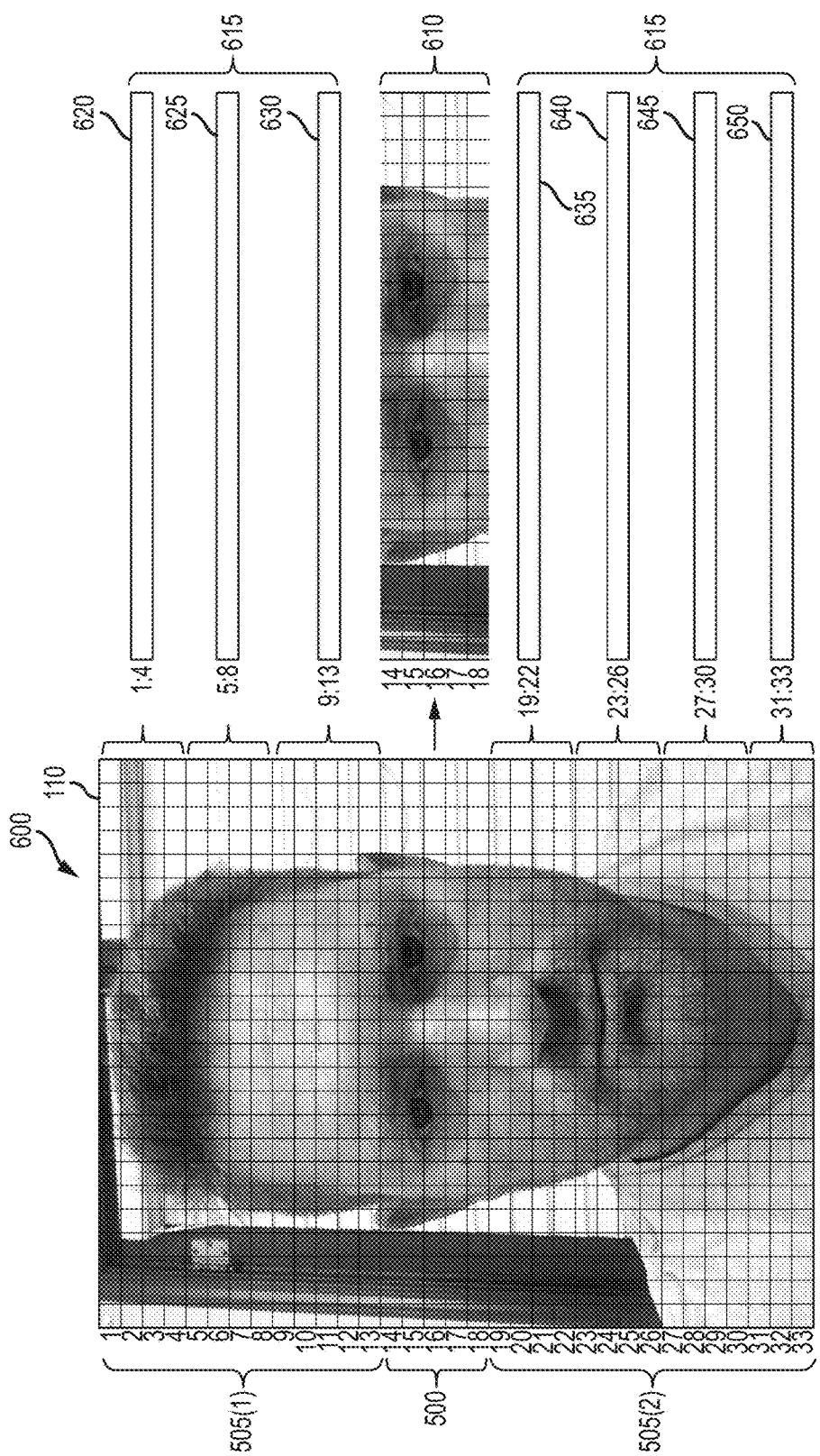
Figure 7:
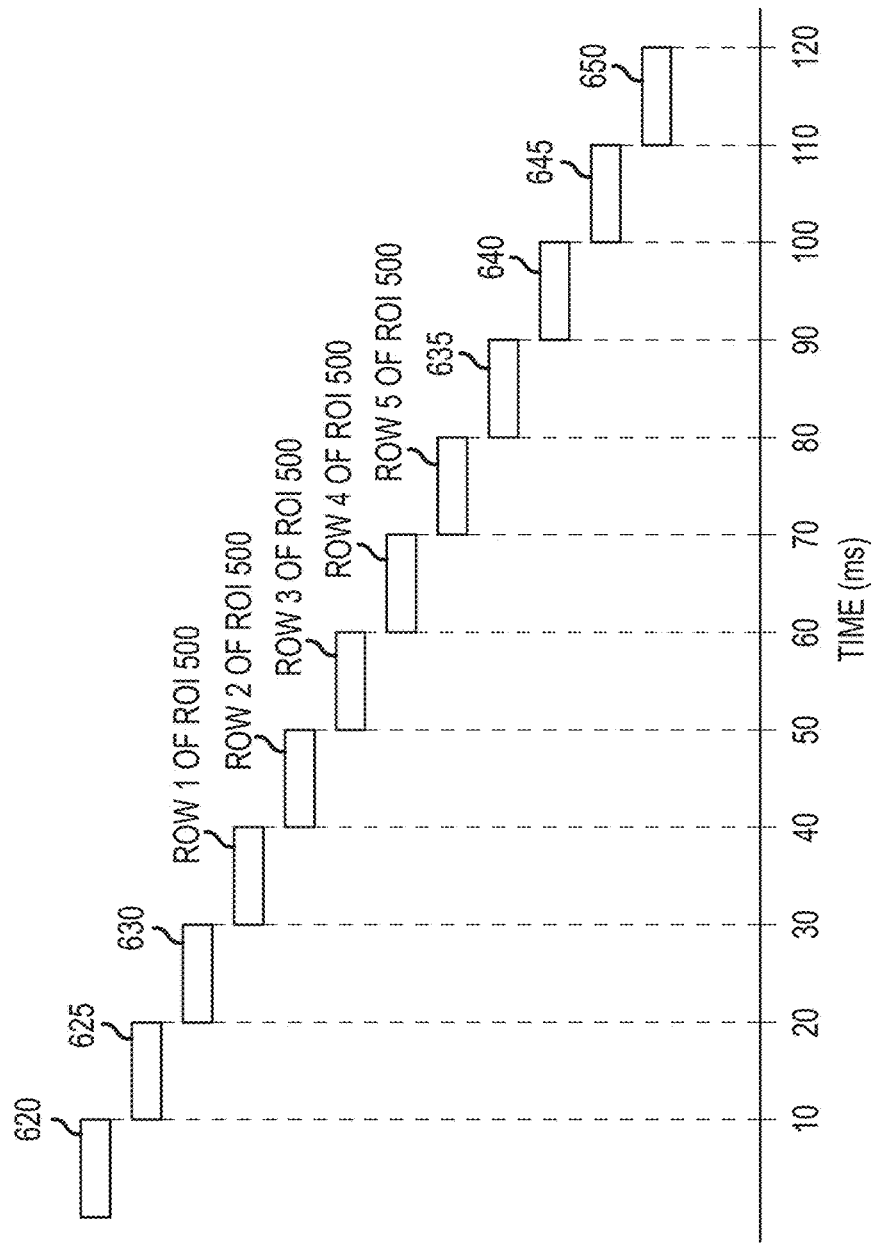
Figure 8:
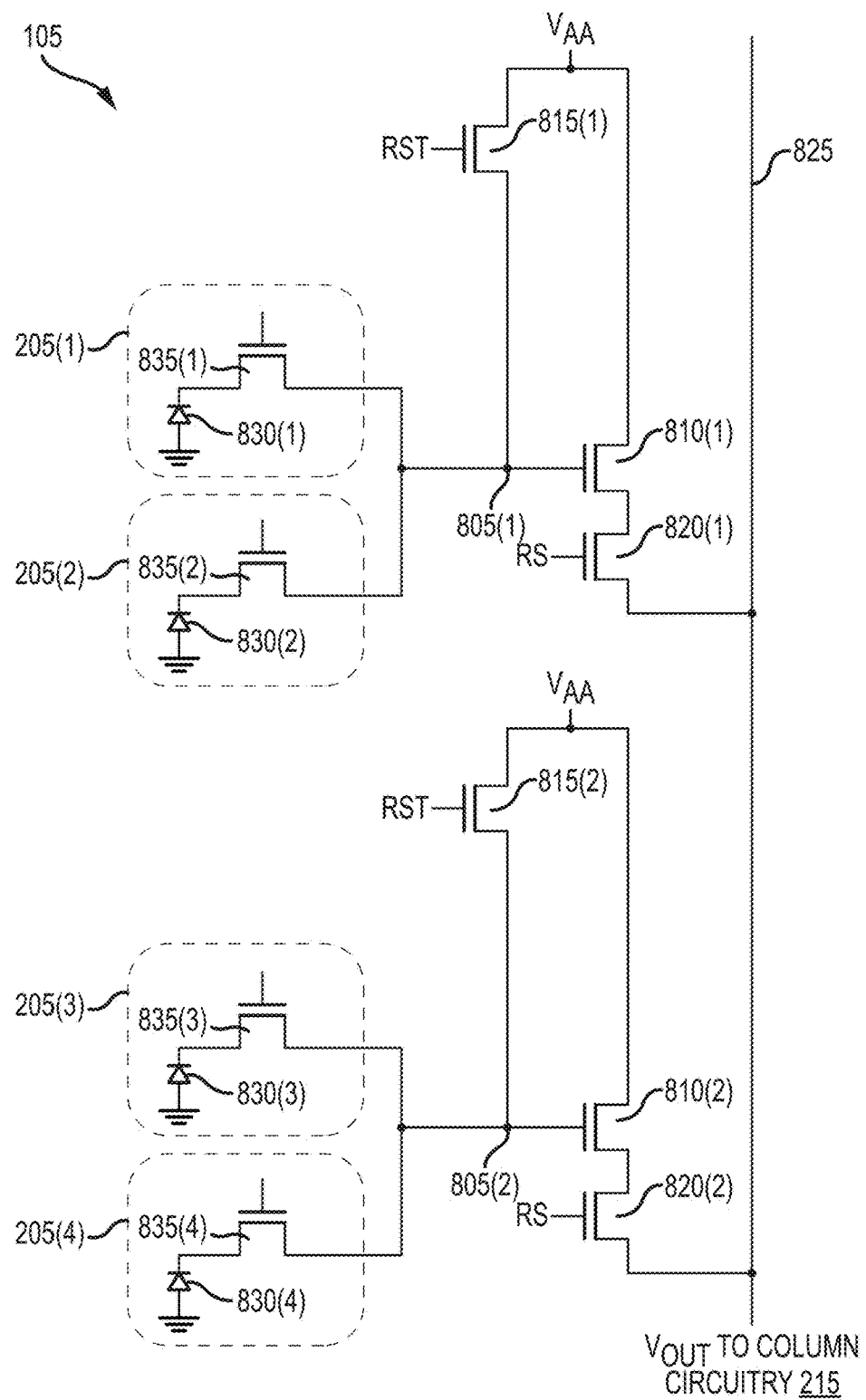

FIG. 3 representatively illustrates a full resolution image captured with a pixel array in accordance with an exemplary embodiment of the present technology;

FIG. 4 representatively illustrates an image with predetermined features detected in accordance with an exemplary embodiment of the present technology;

FIG. 5 representatively illustrates regions of interest and regions of non-interest in accordance with an exemplary embodiment of the present technology;

FIGS. 6A and 6B representatively illustrate binning rows of pixel data in accordance with an exemplary embodiment of the present technology;

FIG. 7 representatively illustrates readout of pixel data in accordance with an exemplary embodiment of the present technology; and FIG. 8 is a circuit diagram of a portion of an image sensor in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various sampling circuits, analog-to-digital converters, color filter arrays, pixel architectures, readout and binning operations, and semiconductor devices, such as transistors, capacitors, image processing units, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for detecting a predetermined feature, capturing image data, sampling image data, processing image data, and the like. In addition, the present technology may be practiced in conjunction with any image sensor operating mode, such as global reset release mode, global shutter mode, and electronic rolling shutter mode.

Methods and apparatus for pixel binning and readout according to various aspects of the present technology may operate in conjunction with any suitable electronic system, such as automotive systems (e.g., advanced driver assist systems), "smart devices," wearables, portable electronics, consumer electronics, and the like. Further, methods and apparatus for the power management unit may be utilized with any suitable imaging system, such as a camera system, video system, machine vision, vehicle navigation, surveillance system, motion detection system, and the like.

Figure 1:
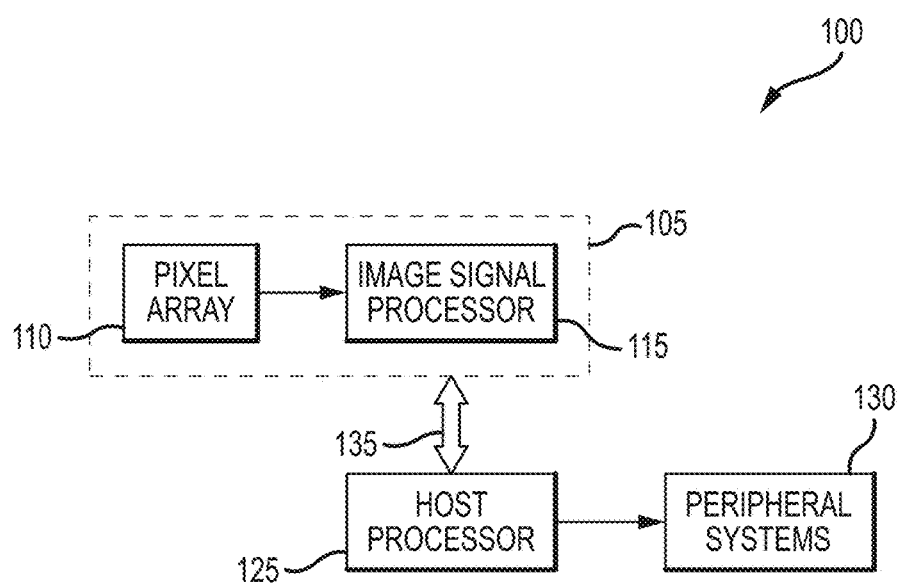
FIG. 1 is a block diagram of an imaging system in accordance with an exemplary embodiment of the present technology.

Referring to FIG. 1, an exemplary system may comprise an automotive system, such as an advanced driver assistance system (ADAS) 100. The ADAS 100 may comprise various integrated circuits configured to communicate with one or more peripheral systems 130, such as the vehicle braking system, steering system, and the like. The ADAS 100 may further comprise an image sensor 105 and a host processor 125.

The host processor 125 may communicate with and control various devices, such as the image sensor 105 and the peripheral system 130. For example, the host processor 125 may transmit a signal to the peripheral system 130 based on information transmitted from the image sensor 105. The host processor 125 may comprise various circuits configured to perform various functions, such as data processing, decision-making, and the like. The host processor 125 may operate in conjunction with other integrated circuits to perform desired functions. For example, the host processor 125 may operate in conjunction with the image sensor 105 to control various aspects of the peripheral system 130. The various functions of the host processor 125 may be determined based on the specific application of the host processor 125. The host processor 125 may comprise any hardware and/or software suitable for decision-making and/or communicating with other devices or systems.

The image sensor 105 captures image data. For example, light may enter and strike a photosensitive surface of the image sensor 105. The image sensor 105 may further process the image data. For example, the image sensor 105 may convert the light into electrical signals. In various embodiments, the image sensor 105 may be configured as an integrated circuit (i.e., a die) comprising various devices and/or systems to perform image capture and various processing functions. The image sensor 105 may be implemented in conjunction with any appropriate technology, such as active pixel sensors in complementary metal-oxide-semiconductors (CMOS) and charge-coupled devices (CCD). For example, the image sensor 105 may comprise a pixel array 110 and an image signal processor 115.

Figure 2:
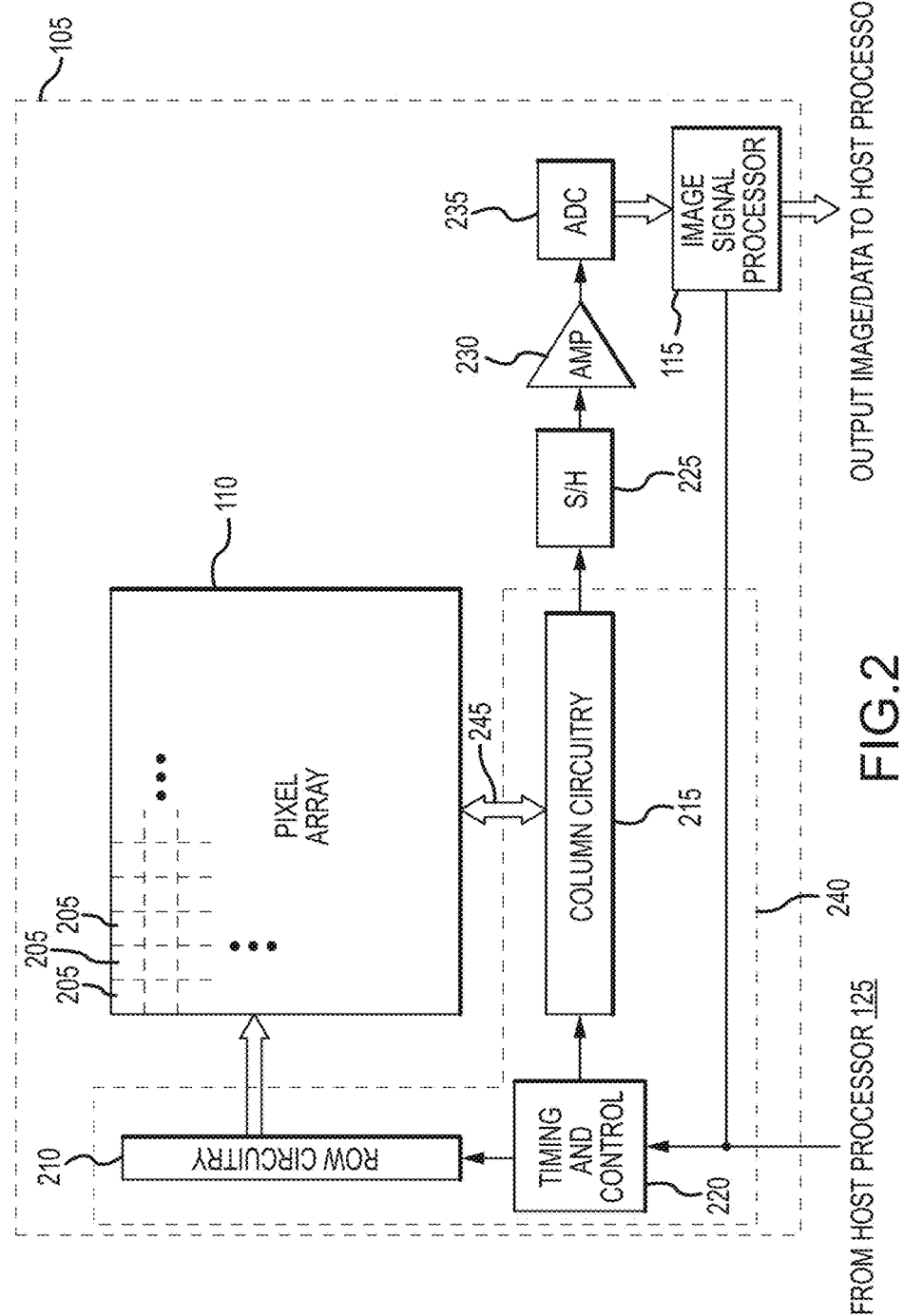
FIG. 2 is a block diagram of an image sensor in accordance with an exemplary embodiment of the present technology.

Referring to FIG. 2, the pixel array 110 detects the light and conveys information that constitutes an image by converting the variable attenuation of waves (as they pass through or reflect off object) into electrical signals. The pixel array 110 may comprise a plurality of pixels 205 arranged to form rows and columns, and the pixel array 110 may contain any number of rows and columns, for example, hundreds or thousands of rows and columns. The pixel array 110 may be coupled to and configured to transmit pixel signals to the image signal processor 115.

Each pixel 205 may comprise a photosensitive region 830 (FIG. 8) for collecting charge, such as a photogate or photodiode, to detect light and convert the detected light into a charge, and various devices to transform the charge into a pixel signal and facilitate readout of the pixel signals. The location of each pixel 205 may be defined by a row number and a column number within the pixel array 110.

In various embodiments, the image sensor 105 may further comprise a lens (not shown) configured to focus an image on the pixel array 110. For example the lens may include a fixed and/or adjustable focus lens.

In various embodiments, the image sensor 105 may further comprise a color filter system (not shown), such as a color filter array (CFA), to filter impinging light according to wavelength. The CFA may comprise a pattern of color filters situated on the pixel array 110 to capture color information. In the exemplary embodiment, each pixel 205 in the pixel array 110 is covered with one color of the CFA. For example, a Bayer color filter array comprising a pattern of red, blue, and green filters may be provided, wherein each pixel 205 is covered with one of a red, blue, or green filter. In other embodiments, the CFA may be formed using other color filters, such as a RCCG filter (one red, two clear, and one green), a RCCC filter (one red, and three clear), a CRGB filter (one cyan, one red, one green, and one blue), and any other suitable color pattern. In various embodiments, the CFA may comprise "clear" or transparent filter elements. The CFA may form a 2×2 color pattern, a 4×4 color pattern, a 2×4 color pattern, or any other suitable pattern size. In various embodiments, the CFA may repeat to cover the entire pixel array 110.

In various embodiments, and referring to FIGS. 2 and 8, the image sensor 105 may further comprise a region and/or a circuit to combine pixel data either prior to or during readout. For example, multiple pixels 205 and/or photosensitive regions 830 may be coupled to and share a common region and/or a common readout path that may be utilized for binning (i.e., combining) the pixel data.

In various embodiments, the image sensor 105 may comprise a common region 805, such as a floating diffusion region (also known as a floating diffusion node), to collect and accumulate charge from multiple pixels and/or multiple rows. The common region 805 may act as a sensing node and may be formed with any device or structure suitable for storing electric charge, such as a diode or capacitor.

In various embodiments, multiple pixels 205 and/or photosensitive regions 830 may share the common region 805 and may be coupled, directly or indirectly via a transfer gate 835, to the common region 805. The number of pixels 205 and/or photosensitive regions 830 coupled to the common region 805 may be based on any suitable criteria such as the architecture (physical layout) of the image sensor 105. As such, the charge from multiple pixels 205 and/or photosensitive region 830 may be binned at the common region 805 into a single charge value.

In various embodiments, the image sensor 105 may further comprise a source follower device 810 to convert the charge in the photosensitive region 830 and/or the common region 805 into a voltage signal. The source follower device 810 is coupled to and may output a single output voltage Vout to a common readout path 825. Two or more separate source follower devices 810 may be enabled (i.e., activated) through their respective row select gates 820 to bin the voltage signals together into the single output voltage Vout during readout.

The image sensor 105 may further comprise various circuits to perform sampling, amplify the signal, and perform various processing on the signal. For example, the image sensor 105 may comprise a readout circuit 240 to selectively activate sequential rows of pixels and transmit (i.e., readout) the pixel signals to a sample-and-hold circuit 225. The readout circuit 240 may further facilitate combining the pixel data from multiple pixels and/or multiple rows by transferring charge out of the photosensitive region 830 and into another region of the image sensor 105, such as the floating diffusion region and the common readout path 825. In various embodiments, the image sensor 105 may comprise row circuitry 210, column circuitry 215, and a timing and control unit 220.

The row circuitry 210 may receive row addresses from the timing and control unit 220 and supply corresponding row control signals, such as reset, row select, charge transfer, and readout control signals to the pixels 205 over row control paths to the pixels 205 in the pixel array 110. The row circuitry 210 may further comprise various wires, electrical connections, and/or devices integrated within the pixel array 110 and that couple to each photosensitive region 830. For example, the transfer gate 835, a row select transistor 820, and a reset transistor 815 responsive to the row circuitry 210 signals may be integrated in the pixel array 110.

The column circuitry 215 may comprise column control circuitry, readout circuitry, processing circuitry, and column decoder circuitry, and may receive image signals, such as analog pixel signals generated by the pixels 205. A column path 245 may be configured to couple each column of the pixel array 110 to the column circuitry 210. The column path 245 may be used for reading out image signals from the pixel 205 and/or supplying bias signal (e.g. bias current or bias voltages). The column circuitry 215 may further comprise various wires, electrical connections, and/or devices integrated within the pixel array 110 and that couple to the photosensitive region 830. For example, the pixel array 110 may comprise a supply voltage $V_{AA}$ and an output bus 825 to transmit an output voltage Vout to the column circuitry 215.

In various embodiments, the timing and control unit 220 may be communicatively coupled to the image signal processor 115 and/or the host processor 125 to receive readout operation instructions. For example, the timing and control unit 220 may be configured to adjust the timing of pixel signal readout, control binning operations, and other desired operations according to various instructions provided by the image signal processor 115 and/or the host processor 125. The image signal processor 115 and/or the host processor 125 may transmit readout operation instructions according to a feature in the digital image and/or a characteristic of the feature detected by the image signal processor 115.

After sampling, the image sensor 105 may transmit the pixel signal to an amplifier 230, wherein the amplifier 230 amplifies the signal prior to being converted to a digital signal (digital pixel data) by an analog to digital converter 235. The digital pixel data may then be transmitted to the image signal processor 115 for further processing.

In various embodiments, the image signal processor 115 may perform various digital signal processing functions, such as color interpolation, color correction, auto-focus, exposure adjustment, noise reduction, white balance adjustment, compression, and the like, to produce a final output image. The image signal processor 115 may further detect and identify various features in a digital image. In one embodiment, the image signal processor 115 may be configured to detect and identify facial features, such as a subject's eyes. The image signal processor 115 may further analyze one or more selected features to determine a particular characteristic, for example, the relative position, size, color, and/or shape of the feature. For example, the image signal processor 115 may determine whether the subject's eyes are open or closed, and/or determine the direction of subject's gaze (e.g., looking up, looking down, etc.). The image signal processor 115 may further be configured to monitor changes in a feature over a period of time, such as from one image frame to another image frame.

The image signal processor 115 may comprise any number of semiconductor devices, such as transistors, capacitors, and the like, for performing calculations, transmitting and receiving image pixel data, and a storage unit, such as random-access memory, non-volatile memory or any other memory device suitable for the particular application, for storing pixel data. The image signal processor 115 may further communicate with and operate in conjunction with the host processor 125 to perform desired functions and/or transmit operation signals to the peripheral system 130.

In a first embodiment, the image signal processor 115 may be implemented with a programmable logic device, such as a field programmable gate array (FPGA) or any other device with reconfigurable digital circuits. In a second embodiment, the image signal processor 115 may be implemented in hardware using non-programmable devices. In yet another embodiment, the image signal processor 115 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

In general, a digital image may be described according to its spatial resolution (e.g., high resolution images or low resolution images). Conventional image sensors generally readout pixel data row-by-row, where the readout rate for each row is the same and the spatial resolution is consistent over the entire digital image. The readout rate may influence various characteristic of the system, such as power consumption and frame rate (the number of frames that can be captured in a predetermined period of time), as the amount of power required to construct the digital image increases as readout rates and frame rates increase.

In operation, the method and apparatus may capture and readout pixel data from a series of image frames to monitor characteristics of a relevant feature appearing in a portion of each frame while reducing the frame rate and retaining relevant data. The method and apparatus may combine data from selected pixels and/or rows of pixels (i.e., a subset of image data), prior to or during readout, to form one or more low resolution regions of a given frame while a region of interest comprising the relevant feature may form one or more high resolution regions of the frame. Frames comprising the region of interest and the combined pixel data (low resolution region) may be read out faster than frames that are read out with only high resolution, resulting in an increase in the frame rate. Accordingly, power consumption may be less than the power consumption of existing technology that reads out the entire frame of every image frame at high resolution.

Referring to FIGS. 1, 2, and 3, the image sensor 105 may capture the image data and construct a digital image utilizing the pixel data received from the pixel array 110. Each area of the digital image may correspond to one pixel 205 of the pixel array 110. In various embodiments, the image sensor 105 may capture a series of image frames. The image sensor 105 may readout rows of pixel data from a first frame 300 capture sequentially and at the same readout rate. As such, the digital image resulting from the first frame 300 capture may be described as a high resolution image.

In various embodiments, the image signal processor 115 may employ a mechanism to detect and identify one or more predetermined features in the digital image 300. For example, as illustrated in FIG. 4, the image signal processor 115 may detect and identify facial features, such as a face, a nose, lips, eyes, and eyebrows. The image signal processor 115 may be configured to detect and identify any feature in the digital image 300, and is not limited to facial feature recognition. Once the image signal processor 115 has identified one or more features, it may select one feature as the relevant feature. The image signal processor 115 may be configured to detect and identify features in images at any resolution. For example, the image signal processor 115 may be able to identify and detect features in low-resolution images as well as high-resolution images. The image signal processor 115 may comprise any suitable device and/or system to detect and identify the predetermined feature and such device and/or system may be implemented in hardware, software, or a combination thereof.

After the image signal processor 115 has identified and selected the relevant feature, for example in this case the relevant feature is the subject's eyes, the image signal processor 115 may further analyze any desired or predetermined characteristics of the relevant feature such as whether the subject's eyes are open or closed. The image signal processor 115 may transmit data related to the feature to the host processor 125. For example, if the subject's eyes are closed, the image signal processor 115 may transmit a signal to the host processor 125 to indicate that the subject may be sleeping or looking down. In the case of an automotive system, where the image signal processor 115 may be employed in an advance driver assist system, the host processor 125 may then transmit a signal to engage the peripheral system 130 to ensure driver attention and/or safety. For example, the peripheral system 130 may respond to the signal from the host processor 125 by steering the automobile, sounding an alarm, vibrating the steering wheel, and/or any other suitable action to enhance driver safety and/or attention.

Referring to FIGS. 2, 4, and 5, the image signal processor 115 may further associate the identified feature with particular pixels 205 and/or rows of pixels in the pixel array 110. In general, the location of the feature in the digital image 300 corresponds to a location on the pixel array 110, which may be described according to the row number and/or column number. The image signal processor 115 may identify a region of interest (ROI) 500 according to the location of the relevant feature. Similarly, the image signal processor 115 may identify a region of non-interest 505, which may be above and/or below the ROI 500.

In various embodiments, the ROI 500 may comprise rows corresponding to the relevant feature as well as rows above and/or below the relevant feature. For example, and referring to FIG. 5, the region of interest 500 may comprise rows 14 through 18, even though the relevant feature corresponds only to rows 15 and 16. The ROI 500 may comprise any number of rows, and the number of rows may be selected according to a particular application and/or the particular feature that is being identified. In various embodiments, the region of non-interest 505 may comprise any remaining rows that are not included in the ROI 500. For example, the image signal processor 115 may identify a first region of non-interest 505(1), which comprise the rows above the ROI 500 (e.g., rows 1 through 13), and a second region of non-interest 505(2), which comprise the rows below the ROI 500 (e.g., rows 19 through 33). The image signal processor 115 may identify any number of regions of interest 500 and regions of non-interest 505, as the number of each may correspond to the number of relevant features.

Referring to FIGS. 2, and 6A-6B, during the capture of a subsequent frame 600, the image sensor 105 may collect charge with the pixel array 110 as described above. The image sensor 105 may bin (i.e., combine) portions of pixel data from the subsequent frame 600 to create a digital image that comprises both a high resolution region and a low resolution region. For example, the binned pixel data may form the low resolution region and the non-binned pixel data may form the high resolution region.

In various embodiments, the image sensor 105 may bin two or more rows from the pixel array 110 corresponding to the region of non-interest 505. The rows that are binned may be collectively referred to as a group. For example, and referring to FIGS. 5 and 6B, the image sensor 105 may bin rows 1 through 4 to form a first group 620, 5 through 8 to form a second group 625, 9 through 13 to form a third group 630, 19 through 22 to form a fourth group 635, 23 through 26 to form a fifth group 640, 27 through 30 to form a sixth group 645, and 31 through 33 to form a seventh group 650. The number of binned rows in each group may be selected according to a particular application, overall number of rows, desired resolution, desired readout rate, desired power consumption, desired frame rate, and the like.

The rows of pixel data for the subsequent frame that correspond to the ROI 500 may be read out sequentially, one row at a time. A resulting image, for example as illustrated in FIG. 6B, will therefore comprise a high resolution region 610 corresponding to the ROI 500 (and the relevant feature) and a low resolution region 615 corresponding to the region of non-interest 505. The resulting image may comprise any number of high and low resolution regions 610, 615 and may be based on the number of regions of interest 500 and regions of non-interest 505.

In various embodiments, the image signal processor 115 may continue to track a general feature in the low resolution region 610. For example, the image signal processor 115 may track an outer edge of a face or a head. The image signal processor 115 may use the data from the low resolution region in conjunction with the data from the high resolution region to evaluate the overall image and transmit information to the host processor 125.

The image sensor 105 may bin the rows of pixel data according to various methods. The binning method may comprise any suitable method that increases the frame rate. For example, in one embodiment, the images sensor 105 may collect and accumulate charge from multiple pixels and/or multiple rows on the floating diffusion region. In another embodiment, the image sensor 105 may combine (e.g., sum or average) two or more voltage inputs into a single output voltage during readout.

The image sensor 105 may then sequentially readout the pixel data starting at the top (e.g., the first row) of the pixel array 100. For example, and referring to FIG. 5, since the first group 620 comprises row 1, the image sensor 105 reads out the first group 620. The image sensor 105 may then read out the remaining groups (e.g., the second group 625 and the third group 630) of binned pixel data sequentially until the image sensor 105 reaches the high resolution region 610. The image sensor 105 may then read out the rows in the high resolution region 610 (e.g., the region of interest) row by row. For example, after the third group 630 is read out, the image sensor 105 may read out a first row of the ROI 500 (e.g., row 14), then a second row of the ROI 500 (e.g., row 15), etc., until all the rows of the ROI 500 have been read out. The image sensor 105 may then continue to read out any remaining groups of binned pixel data, for example the fourth, fifth, sixth, and seventh groups 635, 640, 645, 650, sequentially.

In various embodiments, the frame rate of the first frame 300 is greater than the frame rate of the subsequent frame 600. For example, the readout rate of each row (assuming 33 rows) in the first frame 300 may be approximately 10 ms (milliseconds), providing a frame rate of approximately 330 ms. In contrast, the readout rate of the subsequent frame 600 varies according to the number of rows in the ROI 500 and the number of groups of rows. For example, each group in the subsequent frame 600 may be approximately 10 ms, while the readout rate of each row in the ROI 500 may be approximately 10 ms, providing a frame rate of approximately 120 ms (assuming 7 groups and 5 rows in the ROI). As such, the readout rate of each row in the ROI 500 may be substantially equal to the readout rate of each group.

In various embodiments, the readout rate of the rows in the ROI 500 in the subsequent frame 600 may be the same as the readout rate of the rows in the first frame 300. The readout rate of each group may be based on the number of pixels and/or rows that are combined into one group. As such, the frame rate of the subsequent frame 600 is less than the frame rate of the first frame 300, and the image sensor 105 will consume less power than an image sensor configured to readout all rows at the same rate.

In various embodiments, the readout circuit 240 may control the readout rate of the groups and the individual rows in the ROI 500. For example, the readout circuit 240 may respond to signals from the image signal processor 115 and/or the host processor 125 to control (slow down or speed up) the readout rate of one or more rows of pixel data and/or row groups. In various embodiments, the image signal processor 115 and/or the host processor 125 may adjust the binning operation and readout rate of subsequent frames according to the location of the ROI 500 and/or the detected feature.

In various embodiments, the image sensor 105 may be configured to readout every nth frame at high resolution. For example, the image sensor 105 may readout every row in the pixel array 105 for every $20^{th}$ frame, while the image sensor 105 may perform the binning operation for the remaining frames. Reading out every nth frame at high resolution may ensure that the relevant feature is being properly tracked and hasn't moved, partially or completely, out of an initially-defined region of interest. In such as case where the relevant feature has moved, partially or completely, out of an initially-defined region of interest, the image signal processor 115 may update and/or redefine the region of interest to include the rows comprising the detected feature. For example, the image sensor 105 may readout a first frame at high resolution and detect and identify one or more relevant features. The image signal processor 115 may define the region of interest as rows 14 through 18. The image sensor 105 may readout frames 2 through 19 according to the operation described above, where only the region of interest is read out in high resolution. The image sensor 105 may then readout frame 20 at high resolution. If the image signal processor 115 determines that the detected feature has moved, partially or completely, away from rows 14 through 18, for example if the image signal processor 115 detects and identifies one or more relevant features in rows 19 and 20, then the image signal processor 115 may redefine the region of interest as rows 17 through 21. The image sensor 105 may then readout frames 21 through 39 according to the redefined region of interest, and according to the readout operation described above with respect to binning the regions of non-interest.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging apparatus capable of identifying a predetermined feature and producing an output image, comprising:
   a pixel array, comprising a plurality of pixels arranged to form a plurality of rows;
   an image signal processor coupled to the pixel array and configured to:
      receive pixel data from the plurality of pixels; and
      determine:
         a region of interest according to the predetermined feature, wherein the region of interest corresponds to a first group of consecutive rows from the plurality of rows; and
         a region of non-interest comprising a plurality of remaining rows from the plurality of rows;
   a readout circuit coupled to the pixel array and configured to:
      facilitate combining portions of the pixel data from the region of non-interest to form a plurality of second groups;
      readout each row of the first group according to a first readout rate; and
      readout each of the second groups according to a second readout rate;
      wherein the first readout rate is substantially equal to the second readout rate.

2. The imaging apparatus according to claim 1, wherein the image signal processor determines the region of interest according to a location of the predetermined feature within the plurality of pixels.

3. The imaging apparatus according to claim 2, wherein the region of interest comprises a predetermined number of rows above and below the location of the predetermined feature.

4. The imaging apparatus according to claim 1, wherein:
   the first group produces a high resolution region in the output image; and
   the second groups produce a low resolution region in the output image.

5. The imaging apparatus according to claim 1, further comprising a floating diffusion region coupled to a subset of pixels from the plurality of pixels and configured to sum charges from the subset of pixels.

6. The imaging apparatus according to claim 1, further comprising a plurality of source follower devices coupling a subset of pixels from the plurality of pixels to a common readout path, wherein the plurality of source follower devices may be activated to facilitate summing charges from the subset of pixels.

7. A method for reducing frame rate while retaining relevant data, comprising:
capturing a first image, comprising first image data, with an image sensor comprising a plurality of pixels arranged to form a plurality of rows;
detecting a feature in the first image;
identifying a region of interest corresponding to a first group of consecutive rows from the plurality of rows according to a location of the detected feature within the first image;
capturing a second image, comprising second image data;
combining portions of the second image data that are outside the region of interest to form a plurality of second groups of combined image data;
reading out the plurality of second groups of combined image data; and
reading out the second image data that corresponds to the region of interest in a row-by-row manner;
wherein a duration for reading out each second group from the plurality of second groups is substantially equal to a duration for reading out one row from the second image data that corresponds to the region of interest.

8. The method according to claim 7, wherein combining portions of the second image data comprises summing pixel data from selected rows at a floating diffusion region.

9. The method according to claim 7, wherein combining portions of the second image data comprises summing pixel data from selected rows at a common readout path.

10. The method according to claim 7, wherein detecting the feature in the first image comprises:
sequentially reading out each row of the first image data; and
analyzing the first image data.

11. The method according to claim 7, further comprising detecting the feature in the second image.

12. The method according to claim 7, further comprising monitoring changes in a characteristic of the feature from the first image to the second image.

13. A system capable of producing an output image with high and low resolution regions, comprising:
an imaging apparatus capable of capturing a series of image frames, comprising:
a pixel array, comprising a plurality of pixels arranged to form a plurality of rows;
an image signal processor coupled to the pixel array and configured to:
receive pixel data from the plurality of pixels;
detect and identify a predetermined feature in a first image frame;
determine:
a region of interest according to a location of the predetermined feature within the plurality of pixels, wherein the region of interest corresponds to a first group of consecutive rows from the plurality of rows; and
a region of non-interest comprising a plurality of remaining rows from the plurality of rows;
monitor a characteristic of the predetermined feature in a second image frame; and
transmit an output signal based on the characteristic of the predetermined feature; and
a readout circuit coupled to the pixel array and configured to:
facilitate combining pixel data from the region of non-interest to form a second group;
readout each row of the first group according to a first readout rate; and
readout the second group according to a second readout rate;
wherein the first readout rate is substantially equal to the second readout rate; and
a host processor coupled to the imaging apparatus and responsive to the output signal.

14. The system according to claim 13, wherein the region of interest comprises a predetermined number of rows above and below the location of the predetermined feature.

15. The system according to claim 13, wherein:
the first group produces a high resolution region in the output image; and
the second group produces a low resolution region in the output image.

16. The system according to claim 13, further comprising a floating diffusion region coupled to a subset of pixels from the plurality of pixels and configured to sum charges from the subset of pixels.

17. The system according to claim 13, further comprising a plurality of source follower devices coupling a subset of pixels from the plurality of pixels to a common readout path.

18. The system according to claim 13, wherein the host processor engages a peripheral system based on the output signal.

19. The system according to claim 13, wherein:
the first image frame produces only a high resolution image; and
the second image frame produces an image with a high resolution region and a low resolution region.

* * * * *